US008372283B2

(12) United States Patent
Theodore

(10) Patent No.: US 8,372,283 B2
(45) Date of Patent: Feb. 12, 2013

(54) TREATMENT METHOD REDUCING WASTEWATER INFLUENT CHEMICAL/PHARMACEUTICALS BEFORE BIOLOGICAL REDUCTION TO ENHANCE SEWAGE TREATMENT

(75) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 418 days.

(21) Appl. No.: 12/803,905

(22) Filed: Jul. 9, 2010

(65) Prior Publication Data

US 2012/0006742 A1 Jan. 12, 2012

(51) Int. Cl.
*C02F 3/32* (2006.01)
*C02F 3/30* (2006.01)

(52) U.S. Cl. ........ 210/602; 210/605; 210/630; 210/631; 210/912; 210/913

(58) Field of Classification Search .............. 210/602, 210/605, 630, 631, 903, 912, 913
See application file for complete search history.

(56) References Cited

U.S. PATENT DOCUMENTS

| | | | |
|---|---|---|---|
| 4,304,673 A | 12/1981 | Reynolds et al. | |
| 4,340,489 A | 7/1982 | Adams et al. | |
| 4,765,911 A | 8/1988 | Rasmussen | |
| 5,221,312 A | 6/1993 | Buhidar | |
| 5,906,750 A | 5/1999 | Haase | |
| 6,077,432 A | 6/2000 | Coppola et al. | |
| 6,382,265 B2 | 5/2002 | Weckerle | |
| 2008/0314827 A1* | 12/2008 | Theodore | 210/607 |
| 2009/0294354 A1* | 12/2009 | Theodore et al. | 210/602 |

OTHER PUBLICATIONS

Human Pharmaceuticals in Wastewater Treatment Processes, Jones et al. 2005 Dept of Env. Science and Tech, Fac. of Life Sciences, Imp.Coll.London, UK; Env. Science & Tech, 35:4.
UN Env. Programme Div. of Tech. Ind., and Econ. Newslwetter and Tech. Publ Freshwater Mgt Series No. 1 Biosolids Mgt: An Env. Sound Approach for Managing Sewage Treatment.
The 13th Element, John Wiley &* Sons, Inc., NY, 2000 Chapter "Oh Shit", pp. 271-273.
Phosphorous: "From urine to fire" by Peter E. Childs; http://www. u1.ie/-CinA/Issue 63/TOC27Phosphorous.htmm Jul. 31, 2004.
Pharmaceuticals, Hormones, and Other Organic Wastewater Contaminants in US Streeams, 1999-2000 A National Reconnaissance, Env. Sc. Tech., 36(6) 1202-1211, by Dana W. Ko, (2002).
A review of synergistic effect of photocatalysis and ozonation on wastewater treatment by Augustina T.E. et al., Journal of photochemisty and photobiology Abstract, (2005).
Solid phase extraction and HPLC determination of veterinary pharmaceuticals in wastewater by Sandra Babic, et al., Abstract, (2006).
Welcome to Perchlorate News.com; http://www.perchloratenews. com.
California and Swedent Sign Agreement to Jointly Develop Biomethane and Other Renewable Fuels at p. 5 of 21, (2006).

* cited by examiner

*Primary Examiner* — Fred Prince
(74) *Attorney, Agent, or Firm* — Marcus G. Theodore

(57) ABSTRACT

A sulfurous acid/alkalinization pre-treatment method for wastewaters to condition and remove a number of chemicals/pharmaceuticals and heavy metals before the recovered treated influent undergoes further biological reduction via anaerobic and aerobic digestion.

18 Claims, 3 Drawing Sheets

TREATMENT METHOD REDUCING WASTEWATER INFLUENT CHEMICAL/PHARMACEUTICALS BEFORE BIOLOGICAL REDUCTION TO ENHANCE SEWAGE TREATMENT

BACKGROUND OF THE INVENTION

1. Field

This invention pertains to methods to remove chemicals/pharmaceuticals from wastewater entering wastewater treatment plants employing biological reduction. In particular it pertains to a sulfurous acid/alkalinization pre-treatment method for wastewaters to condition and remove a number of chemicals/pharmaceuticals and heavy metals before the recovered wastewater undergoes further biological reduction via anaerobic and aerobic digestion.

As used herein, the term chemicals/pharmaceuticals are defined as any chemical used for the diagnosis, treatment (cure/mitigation), alteration, or prevention of disease, health condition, or structure/function of the body; and other chemicals entering wastewater streams, such as perchlorates and other fertilizer compounds. The term shall also refer to "pharmaceutical," pharmaceutically active compounds" (PhAC), and "pharmaceuticals and personal care products" (PPCP), which have wide-ranging physical and chemical properties.

2. State of the Art

The presence of human pharmaceutical compounds in surface waters is an emerging environmental issue. Many types of pharmaceuticals are not affected by sewage treatment processes, while others are amenable to some degree of degradation. While water purification techniques such as granular activated carbon could potentially remove these pollutants from wastewater streams, the high costs, their intertwined presence with other solid and liquid components, and handling difficulties involved in these complex aqueous systems require more attention be given to the potential for the optimization of current treatment processes in order to reduce environmental contamination.

In the article entitled "Human Pharmaceuticals in Wastewater Treatment Processes Posted on: Sunday, 31 Jul. 2005, 03:00 CDT, http://www.redorbit.com/news/science/192358/human_pharmaceutical . . . , discusses the current methods for addressing pharmaceutical and chemical reduction:

"A. Biodegradation

There is an obvious potential for biological degradation (aerobic/anaerobic by micro-organisms) of drug substances leading to a reduction of the parent compounds and/or their metabolites during wastewater treatment. Some biodegradation may also occur during in-pipe transport to the STP, but most will probably occur in the secondary stage of treatment when the compound is exposed to large concentrations of micro-organisms. Biodegradation tests can be performed following test protocols such as the closed bottle test (OECD 301D) or the Zahn-Wellens test (OECD 302B). In general, these tests are carried out with several hundred milligrams of a substance as the carbon source. Therefore, they give answers for only fairly extreme conditions, which, despite their intention, simulate only the maximum potential and not the most probable environmental outcome. Therefore, conclusions on the degradability of drugs in STPs [sewage treatment plants] from these tests are of limited value and further research is necessary.

Al-Ahmad et al. assessed the biodegradability of the clinically important antibiotics cefotiam, ciprofloxacin, meropenem, penicillin G, and sulfamethoxazole using the closed bottle test (CBT). None of the test compounds met the criteria for ready biodegradability. Of all the compounds studied, only penicillin G was found to be biodegradable to some degree, with approximately 27% being removed after 28 days. Even when the test was prolonged to 40 days, the removal rate was only increased to 35% indicating the compound was relatively stable.

Kmmerer and Al-Ahmad used the CBT and the modified ZahnWellens test (ZWT) to examine the biodegradability of the widely used antitumor agents 5-fluorouracil, cytarabine, and gemcitabine. 5-Fluorouracil was not biodegradable in either of these tests. Gemcitabine was biodegraded by 42% in the CBT, but prolonging the test period to 40 days only improved this to 45%. Cytarabine was also partially biodegraded in the CBT (50%). In the ZWT, the biodegradation of gemcitabine was also 50% but only after an adaptation period of 20 days, which is not normally included in such tests. Prolonging the test to 40 days improved the degree of biodegradation to 80%, and in the ZWT the biodegradability was over 95%.

Henschel et al. investigated the biodegradability of paracetamol and methotrexate and the two drug metabolites salicylic acid and clofibric acid. Their results were in agreement with other studies and demonstrated that salicylic acid and (to a lesser extent) paracetamol were biodegradable, whereas clofibric acid and methotrexate were not.

Kmmerer studied the biodegradability of three clinically important antibiotics (ciprofloxacin, ofloxacin, and metronidazole) and found none of the compounds were biodegraded. As a consequence the genotoxicity of these compounds (as measured by the SOS chromotest) remained unaffected after treatment. A more comprehensive review of antibiotics in the environment is available in Hirsch et al. This article describes the analysis of various water samples for 18 antibiotic substances, from several groups, including macrolid antibiotics, sulfonamides, penicillins, and tetracyclines. Both STP effluents and surface-water samples were frequently contaminated with sulfamethoxazole and roxithromycin (a degradation product of erythromycin) at concentrations up to 6 g L−1. The highest concentrations detected for tetracyclines and penicillins were 50 and 20 nL−1, respectively. Except for two sites, no contamination by antibiotics was detected from a large number of groundwater samples that were taken from agricultural areas in Germany. This suggests that contamination of groundwater by antibiotics from veterinary applications is relatively minor. Other drugs that have been investigated for their biodegradability include ifosfamide and cyclophosphamide. Both of these compounds exhibited poor biodegradability in the CBT and the ZWT as well as in laboratory-scale activated sludge plants.

Degradation may also occur during bank filtration, if it is used. Heberer et al. found clofibric acid, phenazone, propyphenazone, diclofenac, ibuprofen, and fenofibrate, and two metabolites, jV-methylphenacetin (probably originating from phenacetin) and also a derivative of clofibric acid at concentrations up to the micrograms per liter level in groundwater samples taken from beneath a drinking-water treatment plant. These contaminants were found to leach from the neighboring sewage contaminated surface water by bank nitration through the subsoil.

Molecules with long, highly branched side chains are generally less amenable to biodegradation than unbranched compounds with shorter side chains. Unsaturated aliphatic compounds are generally more accessible to biodegradation than saturated analogues or aromatic compounds with complicated aromatic ring structures and sulfate or halogen groups. Examples of the latter are the x-ray contrast media. Since these compounds are exclusively utilized in human medicine, contaminated STP effluents are presumably the sole sources for these compounds in the aquatic environment. The occurrence of four iodinated x-ray contrast media (diatrizoate, iopamidol, iopromide, and iomeprol) in eight German STPs was examined by Ternes et al. These compounds were found to be ubiquitously distributed in the raw sewage and were not significantly degraded or absorbed during the sewage treatment processes and so remained in the aqueous phase. The concentrations of diatrizoate, iopromide, and iomeprol frequently exceeded 1 g $L^{-1}$ in the raw sewages, and these were found at comparable concentrations in the final effluents, with the maximum concentration measured being 15 g$L^{-1}$ for iopamidol.

A similar study by Steger-Hartmann et al. demonstrated that while these compounds are not readily biodegradable, iopromide was amenable to photo degradation. The resulting degradation product (5-amino-N,N'bis(2,3-dihydroxypropyl)-2,4,6-triiodo-N-methyliso-phthalamide) also exhibited a faster rate of photolysis than the parent compound and was further degraded in a test system simulating surface-water conditions. However, the predicted environmental concentration (PEC) in surface water was still high at 2 $L^{-1}$.

Some degradation of iopamidol in activated sludge has also been observed with 85% being transformed into two metabolites. Degradation of the same compound in river water was even more significant, with a half-life of 3-1 days. However, for other, similar compounds such as diatrizoate the half-life was longer, suggesting there is potential for some compounds to reach rivers and lakes. Although of low toxicity, x-ray contrast media may contribute significantly to the absorbable organic halogen compound (AOX) load in receiving waters. This is of concern because of the high persistence, mobility, and potential of these substances to biotransform to toxic breakdown products.

It is also possible that the biota of a STP may gradually become acclimatized to certain chemicals and therefore may degrade them more effectively given time. For instance Zwiener et al. investigated the biological degradation of pharmaceutical residues (clofibric acid, ibuprofen, diclofenac). In this study both a pilot sewage plant and biofilm reactors operating under oxic and anoxic conditions were run as model systems for municipal sewage treatment, with synthetic sewage and pharmaceuticals in concentrations of 10 $L^{-1}$. Clofibric acid displayed persistence in all cases. The pilot sewage plant and the anoxic biofilm reactor showed comparable results for diclofenac and ibuprofen, which both were partially degraded. A high degree of degradation was found for ibuprofen in the oxic biofilm reactor, which was attributed to adaptation of the biofilm to the residue. This effect has also been show to occur for other compounds, for example, nitrilotriacetic acid, where a period of acclimatization has been shown to be required before biodegradation can begin.102 In addition, the phenomenon of co-metabolism—the oxidation and degradation of nongrowth substrates by micro-organisms—is well documented.

B. Deconjugation

Pharmaceutical compounds are often metabolized in the liver, and as a consequence gluconoride and sulfate conjugates of the parent drugs are excreted. Conjugates of other organic compounds such as steroid hormones have been shown to be readily deconjugated in domestic wastewater and within STPs due to the large amounts of β-glucuridase enzyme present (produced by the fecal bacterium *Escherichia coif*). It seems probable that gluconoride and sulfate conjugates of drug compounds will be degraded by the same process. The effect will be to increase the excreted contribution of the active drugs to sewage and effluents.

C. Partitioning

Partitioning between the aqueous and organic biomass phases is a key component in determining the ultimate concentrations of organic pollutants. Compounds with high log $K_{ow}$ values are known to sorb to sludge, while substances with lower values are more likely to stay in the aquatic phase, depending on the individual compound, 40 and substances sorbing to solids may also be remobilized if they are not strongly bound. It is also well known that bacterial, algal, and fungal cells are capable of adsorbing and accumulation organic pollutants. The activated sludge biomass is able to adsorb organic pollutants such as lindane, and adsorption of these compounds generally fits the Freundlich isotherm. There is a good correlation between compound adsorption and the octanol/water partition coefficient. However, since most drugs are soluble with low log $K_{ow}$ and $K_{oc}$ values, they exist primarily in the aqueous phase and transfer to sewage sludge is probably of only minor concern for the majority of compounds.

There are few studies in the literature detailing potential sorption interactions of drug compounds. Hua et al. studied the removal of chemical oxygen demand (COD), microorganisms, and selected pharmaceutical compounds by trickling wastewater through a sandy soil from the Rhine valley in glass columns. The sewage contained low concentrations of at least 10 different pharmaceuticals and x-ray media. Some of the compounds were removed by adsorption onto sand and/or biodegradation. The rate of removal varied from complete (e.g., ibuprofen and naproxen), to almost none, for several x-ray contrast media. Some of the compounds were removed as effectively by this method as by conventional sewage treatment.

Jones et al. estimated physicochemical values for the top 25 pharmaceuticals in England in 2000 using a computer model. Of the top 25 compounds, 16 had low predicted sorption potential and were thought unlikely to bind to sludge solids. Five compounds had medium sorption potential and two (quinine sulfate and mefenamic acid) were predicted to have a high capacity to bind to solids (no data were available for the remaining two compounds). Although this study indicated some removal to solids for mefenamic acid, it did not demonstrate that all would be removed and in fact this compound has been found to be present in sewage effluent. The concentrations of mefenamic acid in three sewage effluents as well as upstream and downstream of the effluent discharge point have been reported by Hilton and Thomas. The report does not, however, quote influent concentrations, so it is impossible to say how much was lost during treatment. For instance, if the concentration in the influent was double the concentration in the effluent, this would indicate a potentially high binding capacity (or biodegradation rate). A second paper by Soulet et al. indicates a high degree of variation in the removal of mefenamic acid depending on the STP studied. Some exhibited a high removal, while others showed almost none indicating the importance of design and operational factors and/or climatic conditions. This means a definitive conclusion cannot be reached with regard to the removal rates of this drug within STPs, other than that it is potentially highly dependent on plant design, wastewater characteristics, and, most importantly, the operational regime.

Bester studied the fate of the antimicrobial triclosan (2,4, 4'-trichloro2'-hydroxyphenyl ether) in a German sewage treatment plant that processed 200,000 $m^3$ wastewater per day. The concentrations in the influent (~1000 ng $L^{-1}$) were compared to those in the effluent and the sludge, and a mass balance of the works was prepared. Thirty percent of the triclosan was found to sorb to the sludge with weak bonds, but only about 5% of the influent concentration was found in the effluent. Thus, most of the incoming material was not recovered as the parent compound, and the authors suggest that it is likely that it is transformed to other metabolites or unrecovered bound residues. This compares well with a study by Singer et al., who, during a field study, attributed the fate of triclosan in a wastewater treatment plant to be 79% biological degradation, 15% sorption to sludge, with 6% being discharged to the receiving surface water. Despite the high overall removal rate, the concentration i\n the wastewater effluents were in the range of 42-213 ng $L^{-1}$, leading to concentrations of 11-98 ng $L_{-1}$ in the receiving rivers.

A recent review of veterinary drugs by Tolls suggests that mechanisms other than hydrophobic partitioning play a significant role in sorption of animal (and potentially human) medications. A number of hydrophobicity independent mechanisms such as cation exchange, cation bridging at clay surfaces, surface complexation, and hydrogen bonding also appear to be involved. These processes are not accounted for by organic carbon normalization, suggesting that this data treatment is conceptually inappropriate and fails to describe the sorption behavior. In addition, some drug compounds may be anions at the pH values in STPs and the environment. This will lower the effective $K_{ow}$ and decrease their sorption potential.

D. Removal During Sludge Treatment

Drugs may also be degraded during sewage treatment processes. Many pharmaceuticals are not thermally stable and so might be expected to break down during processes such as composting due to heat (as well as chemical and biodegradation). A study by Guerin investigated soil composting as an alternative to incineration for the treatment of a silty clay soil that had become contaminated with residues of Probenecid (an antigout drug) and Methaqualone (a barbiturate substitute no longer available due to harmful side effects). In pilot scale trials, Probenecid was reduced from 5100 mg $kg^{-1}$ to <10 mg $kg^{-1}$ within 20 weeks during mesophilic treatments. The study also confirmed that thermophilic composting was effective under field conditions. In the full-scale treatment, 180 tons of soil were composted. Initial concentrations of the major contaminants in the full-scale compost treatment facility for Probenecid and Methaqualone were 1160 mg $kg^{-1}$ and 210 mg $kg^{-1}$, respectively. Probenecid concentration reached the target level of 100 mg $kg^{-1}$ in 6 weeks, and removal of Methaqualone to <100 mg $kg^{-1}$ was achieved after 14 weeks. The study concluded that composting was effective in reducing soil concentrations of Probenecid and Methaqualone residues to acceptable values and hence is a technology that has potential application in the remediation of pharmaceutical contaminants in sludge/soil, although further testing using other drug compounds and soils would be necessary.

E. Photodegradation

Several pharmaceutical compounds have been shown to degrade due to the action of sunlight. The most extensively studied of these compounds is the analgesic/anti-inflammatory drug diclofenac, which has been shown to degrade in the aquatic environment due to ultraviolet (UV) light. Other compounds such as the topical antimycotic drugs naftifine, sulbentine, cloxiquin, tolnaftate, and chlorphenesin have also been shown to be light sensitive, and an overall elimination rate of 0.03 $day^{-1}$ due to photochemical degradation was observed for triclosan in the epilimnion of Lake Greifensee by Singer et al.

Andreozzi et al. carried out a monitoring survey of STP effluents in Italy, France, Greece, and Sweden and found more than 20 individual pharmaceuticals. The photodegradation of six compounds (carbamazepine, diclofenac, clofibric acid, ofloxacin, sulfamethoxazole, and propranolol) was tested. Carbamazepine and clofibric acid were found to have the longest half-lives (of the order of 100 days at the most northerly areas sampled), whereas sulfamethoxazole, diclofenac, ofloxacin, and propranolol were found to undergo faster degradation with half-lives of 2.4, 5.0, 10.6, and 16.8 days, respectively. For almost all the studied compounds, except propranolol, the presence of nitrate ions in aqueous solutions resulted in a reduction of the measured half life. This effect may be ascribed to the formation of HO radicals due to photolysis of nitrate. The authors point out that besides pharmaceutical residues, other species targeted by OH radicals, such as naturally occurring organic constituents, are present in rivers and lakes. For this reason, the effect caused by nitrate on the degradation rates of the pharmaceuticals found in this study should be interpreted only as a tendency if no other organic molecules but the substrate are present in the test solution.

A more complex situation arose when humic acids were added to the solutions containing the pharmaceuticals. Humic acids are known to exert two opposite effects on the rate of photodegradation of organic molecules in water. Due to their capability to absorb UV radiation in a broad range of wavelengths, they can reduce the available energy for the organic molecules present in the solution, thus acting as an inner filter (thus decreasing photodegradation). At the same time, the molecules of humic acids submitted to UV irradiation are promoted to a transient, excited state, in which they may react with oxygen in the solution, forming reactive species as singlet oxygen, or react directly with other organic species, thus promoting their phototransformation. The overall effect of humic acids on the phototransformation rate of an organic substance will therefore depend on the balance between these two opposite contributions. In the study, humic acids were found to act as inner filters toward carbamazepine and diclofenac, but as photosensitizers toward sulfamethoxazole, clofibric acid, oflaxocin, and propranolol.

Buser et al. established that up to 90% of diclofenac entering a Swiss lake was degraded with a half-life of less than 1 $h^{-1}$. Incubation of lake water, fortified with diclofenac, exhibited no reduction in the dark, suggesting minimal chemical and biological degradation. However, when the fortified water was exposed to sunlight, rapid degradation was observed that indicated that this was the result of photodegradation. The use of sewage lagoons may therefore increase the removal of light sensitive compounds as demonstrated by Kreuzinger et al., who showed that removal rates of diclofenac were only 14% with just activated sludge treatment, while after further polishing in a sewage lagoon concentrations decreased to below the limits of detection. Adsorption and biodegradation were ruled out as the cause of the decrease, as there was no developed/active sludge flock in the lagoon, leaving photodegradation as the most likely cause.

Latch et al. studied the photochemical fates of the histamine H2receptor antagonists cimetidine and ranitidine. Each displayed high rates of reaction with both single oxygen and hydroxyl radicals, with two transient oxidants being formed in sunlit natural waters. Ranitidine was degraded in direct photolysis experiments with a half-life of 35 min under noon summertime sunlight at 45° latitude, while cimetidine was shown to be resistant to direct photolysis. The results of these experiments, combined with the expected steady state near-surface concentrations of single oxygen and hydroxyl radicals, indicate that photo-oxidation mediated by single oxygen radicals is the likely degradation pathway for cimetidine in most natural waters, while photodegradation by direct photolysis is expected to be the major pathway for ranitidine. However, the extent of photo-induced degradation of pharmaceuticals can vary significantly for different pharmaceuticals, and it strongly depends on the aqueous constituents (such as humic and fulvic acids) present in solution. In addition, light levels within STPs are likely to be much lower than in the environment (effectively zero), due to the higher solids content. Indeed, Koutsouba et al. found diclofenac to be widespread in Greek domestic sewage effluent, with concentrations in effluent ranging from 10 to 365 ngL^sup −1^. Given the inherent photosensitivity of this compound, its presence in sewage effluent would seem to indicate that photodegradation is highly unlikely to take place within STPs where light penetration is minimal at best."

The above demonstrates that it may be possible to remove pharmaceuticals and other organic contaminants from sewage using available technologies. However, these methods traditionally require significant costly upgrades to the STPs. Capital and operational costs are especially high for ozonation plants and other tertiary treatment options.

The pre-treatment method described below provides an inexpensive chemical installation and method to degrade and remove a number of chemicals/pharmaceuticals in wastewater influent via acid reduction and removal of suspended solids of sorbed polar pharmaceuticals/chemicals before liming the filtered acidified influent to further precipitate heavy metals and other chemicals/pharmaceuticals and raise the pH of the treated effluent for biodigestion with anaerobic and aerobic bacteria to further remove chemicals/pharmaceuticals.

SUMMARY OF THE INVENTION

The method comprises a pre-treatment method to enhance sewage treatment plant bioreactor removal efficiencies by removing chemicals/pharmaceuticals before biological reduction. It comprises:
  a. injecting $SO_2$ into wastewater influent forming acidified wastewater at a pH which generates sufficient sulfurous acid for conditioning suspended solids to agglomerate and separate from the liquid fraction of the acidified wastewater and attract sorbed polar chemicals/pharmaceuticals, while providing free SO2 for reducing chemical oxidants in the influent to produce an acidified treated influent,
  b. separating the agglomerated suspended solids with sorbed polar chemicals/pharmaceuticals from the acidified treated influent for disposal or reuse,
  c. adjusting the pH of the acidified treated influent with hydrated or anhydrous lime, ammonia, sodium and potassium hydroxide and other alkaline chemicals to reduce the biocidal properties of any free $SO_2$, sulfite, and bisulfite in the wastewater and provide a pH conditioned wastewater suitable for subsequent environmental biological treatment, and precipitating heavy metals as metal hydroxides and other alkaline precipitates to produce a treated effluent,
  d. separating any precipitates in the treated effluent for reuse or disposal, and
  e. passing the treated effluent through the sewage treatment plant's bioreactors for anaerobic and aerobic degradation of remaining chemicals/pharmaceuticals in the treated effluent to produce a recovered treated effluent.

SO2 acts as a redox agent reducing certain oxidizing agents such as perchlorates and its related chlorine species. It also reduces iodine and Mn+7 to Mn+2. Some sulfonylurea herbicides are more susceptible to acid hydrolysis at pH less than 6.0. Other insecticides, particularly organophosphates and carbamates, are more susceptible to alkaline hydrolysis than other pesticides. The rapid pH fluctuation of this sulfurous acid/alkalinization cycle may thus have an affect in reducing the compounds themselves via hydrolysis. However, precipitation and sorption of the polar organic molecules onto the suspended solids for removal usually is a greater factor where the acid/alkalinization cycle is usually less than 1 hour.

Often, an aeration cycle precedes the SO2 treatment first to oxidize chemicals/pharmaceuticals in the influent, as well as kill viruses. This oxidation/reduction cycle has a degrading effect on many chemicals/pharmaceuticals.

The pH of the $SO_2$ acidified wastewater is usually adjusted between 2 and 6.5 to acid leach any heavy metals from the suspended solids into the liquid phase for subsequent removal. If disinfection of the influent is required, the acidified wastewater is lowered to a pH between 2 and 3.5 to provide sufficient $SO_2$, sulfite, and bisulfite for the dwell time required for disinfection (10 minutes to an hour). At this low pH, the suspended solids also self agglomerate and sorb polar chemical/pharmaceuticals for subsequent removal. Empirically it was found at Montalvo Municipal Improvement District that at a pH of approximately 3, even fine suspended solids self adhere in settling ponds allowing light to penetrate as much as 10 feet to the bottom of an open pond; thereby exposing the wastewaters undergoing various treatments to photodegredation of chemicals/pharmaceuticals.

If the concentration of suspended solids is not sufficient for sorption removal, activated carbon may be added to increase the available sorption sites. Activated carbon, when acidified, behaves similarly to the conditioned acidified solids and is easily removed by filtration.

Empirically, it was found that even at a pH of 3.5 or lower, solids self agglomerated to encourage attraction of cationic species. Hormones and antibiotics commonly found in wastewater have polar functional groups. These chemicals may occur as negative, neutral, zwitterionic, and positively charged species that have sorption behavior that is dependent on solution pH. Many antibiotics and hormones are also lipophilic (hydrophobic) compounds that adsorb strongly. Consequently many pharmaceuticals sorb to the acidified conditioned agglomerated suspended solids and are removed along with them by filtration.

Generally organic compounds removed through coagulation/flocculation are hydrophobic, low molecular weight acidic functional groups such as carbony and carboxyl compounds, or high molecular weight compounds. By employing acidification, coagulation is therefore encouraged.

After filtration, the pH of the filtered wastewater is then raised to reduce the biocidal properties of any free $SO_2$, sulfite, and bisulfite in the wastewater and protect the bacteria in the bioreactors. The pH conditioned wastewater entering the bioreactors is generally raised to a pH of between 7 and 9, which also precipitates out iron, chromium, copper, zinc, and nickel ions as hydroxides for removal. This leaves a conditioned reduced metal wastewater at a pH, which doesn't harm the bacteria in the bioreactors. Solubility of metal hydroxides as precipitates are amphoteric, being soluble at both alkaline and acid conditions. At pH's between 7 and 9, Fe+3, Chromium, copper, and zinc form precipitates. Zinc, Nickel, Cadmium, and lead require pH's up to 11 to precipitate out. Thus, the pH is selected to remove the desired heavy metals and then adjusted to insure that the bioreactor bacteria are not adversely be affected. This may require sequential elevation and filtration of the pH between 7 and 11 for precipitating all the heavy metals, before lowering the pH with acid to that required by the bacteria. Where concentrations of zinc, nickel, and cadmium ions are not significant, the pH is usually set between 7 and 9 to both remove the other metal ions that precipitate at this pH so as not to interfere with the bacteria.

In addition to metal hydroxide precipitates, calcium salts of excess sulfates and phosphates, such as calcium sulfate (gypsum), and calcium phosphate may be precipitated when aqueous, nonaqueous, or spent lime is used to raise the pH. Also, the iron hydroxides may entrap selenium in the wastewater to remove some selenium. These complex precipitates are then filtered and removed to recycle the heavy metals, or disposed of in accordance with hazardous waste regulations governing heavy metals disposal.

The filtered pH adjusted recovered wastewater is then passed through the bioreactors to further break down pharmaceuticals. As these bioreactors are often open to light, the clear recovered wastewaters are exposed to light to further photo degrade certain light sensitive chemicals/pharmaceuticals contained therein. Bioreactors, as used herein, refer to any type of sequential batch reactor, membrane bioreactor, activated sludge basins, nitrification tanks, denitrification tanks, clarifiers, or other treatment process employing aerobic and anaerobic bacteria to remove suspended and solids and other dissolved nutrients in the wastewater, such as ammonia, phosphorous, nitrates, etc. These bacteria typically operate best at wastewater pH's of between 7 and 9. Consequently, before the acidified wastewater is passed through the bioreactors, the pH is adjusted to that required to precipitate heavy metals as metal hydroxides, while preventing interference with the bioreactors.

Given that the more easily digested suspended solids have been removed, the digester bacteria start reducing the more difficult chemicals/pharmaceuticals rendering the bioreactor more efficient for chemical/pharmaceutical bacterial degradation.

The pH swings during this pre-treatment method also degrades a number of chemicals/pharmaceuticals through acid hydrolysis and alkaline hydrolysis, depending upon dwell time. Because of the number of different chemicals/pharmaceuticals and their different stabilities, the hydrolysis mechanism is hard to predict and may take place at a rate, which is not significant under the rapid processing sequence of the present method.

In some wastewater treatment plant retrofits, a portion of the treated effluent is diverted and used for raising crops and photobiomass so the alkaline chemicals used to raise the pH of the diverted treated effluent are selected to provide micronutrients in the treated effluent required for raising crops or photobiomass. The added calcium from the lime also off-sets saline sodium concentrations to aid in plant nutrient assimilation when land applied.

If the chemicals/pharmaceuticals in the recovered wastewater are still too high for discharge, the recovered wastewater may be further polished by aquatic plant treatment to remove heavy metals, pathogens, chemicals/pharmaceuticals, and micronutrients to a level suitable for open water discharge or soil aquifer treatment. A preferred aquatic plant for this purpose is duckweed, which not only absorbs heavy metals, and pharmaceuticals, but pathogens as well.

Preferably, the agglomerated separated solids are burned or gasified to destroy any sorbed chemicals/pharmaceuticals from re-entering the water supply.

The pre-treatment method thus provides an inexpensive chemical installation and method to degrade and remove a number of chemicals/pharmaceuticals in wastewater influent by:

a. sulfurous acid reduction of oxidants and pathogens in the wastewater.
b. acidification agglomeration and separation removal of agglomerated suspended solids having sorbed polar pharmaceuticals/chemicals producing a filtered acidified influent.
c. precipitating and removing heavy metals and other chemicals/pharmaceuticals by liming the filtered acidified influent to further to raise its pH for biological degradation.
d. biodegrading the reduced metals filtered acidified influent with anaerobic and aerobic bacteria to further remove chemicals/pharmaceuticals and provide a recovered wastewater suitable for reuse.
e. photodegradation of chemicals/pharmaceuticals remaining in the filtered acidified influent while undergoing biodegradation in bioreactors and percolation ponds.

It may be employed as an inexpensive pre-treatment retrofit of an existing wastewater treatment plants before the wastewater enters the bioreactors or as a standalone treatment where the recovered treated wastewater is to be land applied or used to recharge aquifers via soil aquifer treatment.

DESCRIPTION OF THE ILLUSTRATED EMBODIMENTS

Figure 1:
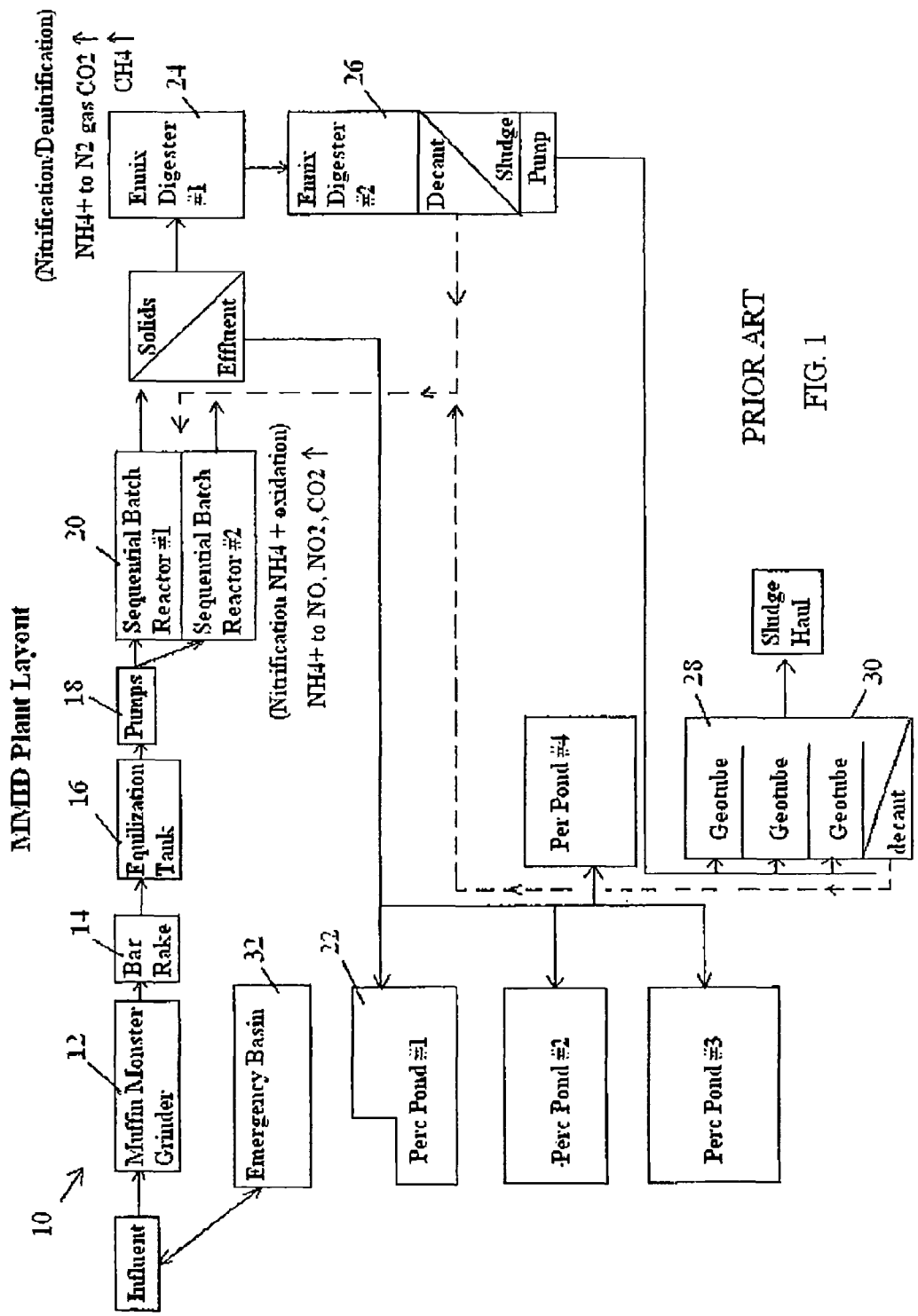
FIG. 1 is a plant layout of a typical wastewater treatment plant.

FIG. 1 is the plant layout of the Montalvo wastewater treatment system 10, which is a typical wastewater treatment system employing bacterial biodegradation. It comprises an influent wet well (not shown), muffin monster grinder 12, flow screen bar rake 14, equalization tank 16, three influent variable speed influent pumps 18, two sequencing batch reactors 20, and effluent decanted to four percolation ponds. The two sequencing batch reactors 20 are filled with a sludge blanket containing various anaerobic and aerobic bacteria, which require a pH of around 7.0 or above to be maintained.

The entering screened influent enters the sequencing batch reactors 20 in a mix/fill step for 15 minutes under anaerobic conditions in an anoxic zone for denitrification to take place. Where oxygen is depleted, heterotrophic bacteria respire nitrate as a substitute terminal electron acceptor. Denitrification generally proceeds through some combination of the following intermediate forms:

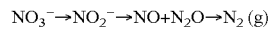

The complete denitrification process can be expressed as a redox reaction:

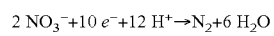

Next, the denitrified influent/fill is mixed in the presence of air for 70 minutes in an oxic zone for nitrification to occur. Nitrification is a microbial process by which reduced nitrogen compounds (primarily ammonia) are sequentially oxidized to nitrite and nitrate. The nitrification process is primarily accomplished by two groups of autotrophic nitrifying bacteria that can build organic molecules using energy obtained from inorganic sources, in this case ammonia or nitrite. In the first step of nitrification, ammonia-oxidizing bacteria, such as Nitrosomonas, oxidize ammonia to nitrite according to the following equation:

$$NH_3 + O_2 \rightarrow NO_2^- + 3H^+ + 2e-$$

Oxygen is also required to be added to inactivate viruses in wastewater under present Title 22 Health Department recovered wastewater regulations.

Next nitrite-oxidizing bacteria oxidize nitrite to nitrate according to equation:

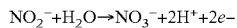
$$NO_2^- + H_2O \rightarrow NO_3^- + 2H^+ + 2e-$$

There is a five minute react stage where no additional influent is added to allow the nitrification step to go to completion. Most carbonaceous BOD removal occurs in the react phase. Further nitrification also occurs by allowing the mixing and aeration to continue, even though the majority of denitrication occurred in the fix/fill phase.

The denitrified/nitrified influent is then allowed to settle for 50 minutes without aeration. To aid in solids settling, polymers may be added.

Approximately one third of the settled treated wastewater is then decanted over 30 minutes in a final step providing a treated decant, which is sent to percolation ponds 22. An approximately nine foot deep sludge blanket is left in the sequential batch reactors 20 to treat additional wastewater influent. The total processing time for the treated wastewater passing through the sequential batch reactors is therefore approximately 9 hours.

The settled waste activated sludge from the sequencing batch reactors 20 is pumped to a first Ennix Digester 24, and then to a second Ennix Digester 26 as part of a 30 day guaranteed treatment process to reduce the volume of solids in waste treatment ponds by 40% or more. The sludge from the second Ennix Digester 26 is mixed with additional polymers and pumped into Geotubes 28 placed on a sludge basin 30 for solids separation. Although any filtration system could be employed, the Geotubes 28 are cheap and do not require a lot of electricity for solids separation. To maintain a sufficient level for sludge retention time, decant from the second Ennix Digester 26 is pumped back into the sequencing batch reactors 20. Any decant from the Geotubes 28 is pumped back to the sequential batch reactors 20 or the second Ennix Digester 26. As 200 tons of (18% moisture) of dried sludge from the Geotubes 28 are annually hauled to a disposal site, without Ennix Digestion there would be approximately 330 (200 tns/0.6)[1] tons of sludge per year.

[1] Conservatively assuming that 130 tons of Ennix reduced sludge is mostly carbon and only produces carbon dioxide rather than more potent methane and nitrous oxide gases, which have in excess of 30 times the affect on uv absorption, this would result in approximately 400 tons of carbon dioxide greenhouse gas emitted by Ennix Digestion per year. (Carbon combines with two oxygen molecules having a greater weight than carbon, so the total amount of carbon dioxide is approximately 3 times this 130 tons, or 400 tons per year. Actual green house gas calculations would be based on field tests of the composite emissions including methane and nitrous oxides). Thus, avoidance of sludge digestion reduces these air emissions to provide carbon credits, and a biofuel for co-firing to provide work and biofuel credits.

Both the sequential batch reactors 20, and the Ennix digesters 24, 26 have layers of floating suspended solids and polymers on the top of the treated wastewater, which prevents light from penetrating and photo degrading chemicals/pharmaceuticals undergoing biological reduction.

The wet weather plant 10 has a design capacity of 750,000 gallons per day (gpd). An average daily dry weather flow of up to 366,000 gpd was discharged during 1995. Waste sludge is treated onsite by aerobic digestion, and then discharged into lined sludge drying beds 30 with woven polyethylene bags 28 to collect the solids. Treated separated sludge is hauled offsite and disposed of at a legal disposal facility.

During high flows and/or maintenance of the sequential batch reactor 20 process, a 1,000,000 gallon concrete lined emergency basin 32 is used to hold influent for later return to the sequencing batch reactors. A standby emergency power generator (not shown) is ready for any power interruption.

Figure 2:
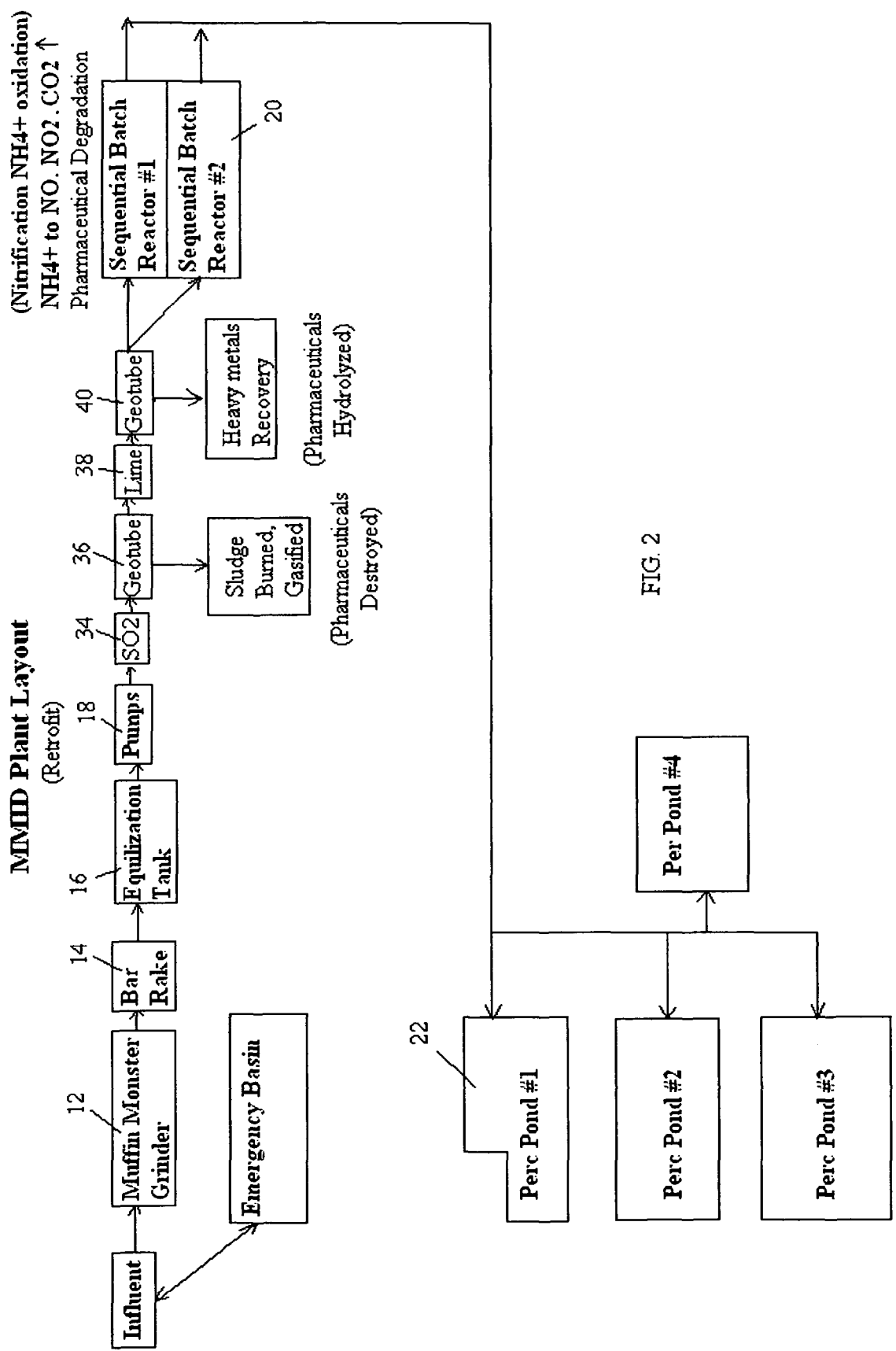
FIG. 2 is a retrofit of the plant shown in FIG. 1 adapted with the present invention.

FIG. 2 is a retrofit of the Montalvo wastewater treatment plant 10 shown in FIG. 1 adapted with the present invention. Before the influent passes through the sequential batch reactors 20, the influent is acidified by $SO_2$ injection (usually generated on-site with a sulfur burner 34 adapted to inject $SO_2$ into wastewater passing there through or from a tank of pressurized $SO_2$) to a pH of less than approximately 3.5 to self agglomerate the solids, and held in an enclosed tank 35 from 10 minutes to an hour for disinfection. During this period, any chemical oxidants, such as perchlorates, in the influent are reduced by the free $SO_2$, and chemicals/pharmaceuticals with polar active molecular groups sorb onto the agglomerated suspended solids. The acidified influent is then passed through a woven filtration bag, such as a Geotube 36 produced by Ten Cate of Georgia to remove the suspended solids with sorbed chemicals/pharmaceuticals for subsequent burning or gasification to insure that they do not re-enter the water systems.

The filtered acidified wastewater is then passed through a liming tank 38 associated with a pug mill 39 to raise the pH sufficiently to precipitate out any heavy metals and reduce the biocidal properties of any free $SO_2$, sulfite, and bisulfite in the wastewater and provide a pH conditioned wastewater suitable for subsequent environmental biological treatment. This adjusted alkaline wastewater has a pH of between 7 to 9, which precipitates iron, chromium, copper, zinc, and nickel as metal hydroxides for removal by passing it through another Geotube 40 for heavy metals recovery or disposal.

The demetalized adjusted pH treated wastewater is then passed through the sequential batch reactors 20 for chemical/pharmaceuticals biodegradation. The Ennix digesters 24, 26 are bypassed and shut down saving greenhouse gas emissions. Geotube 36 separates and drains conditioned dewatered solids having approximately 4% water content and a BTU content of approximately 7,000 BTU/lb.

Figure 3:
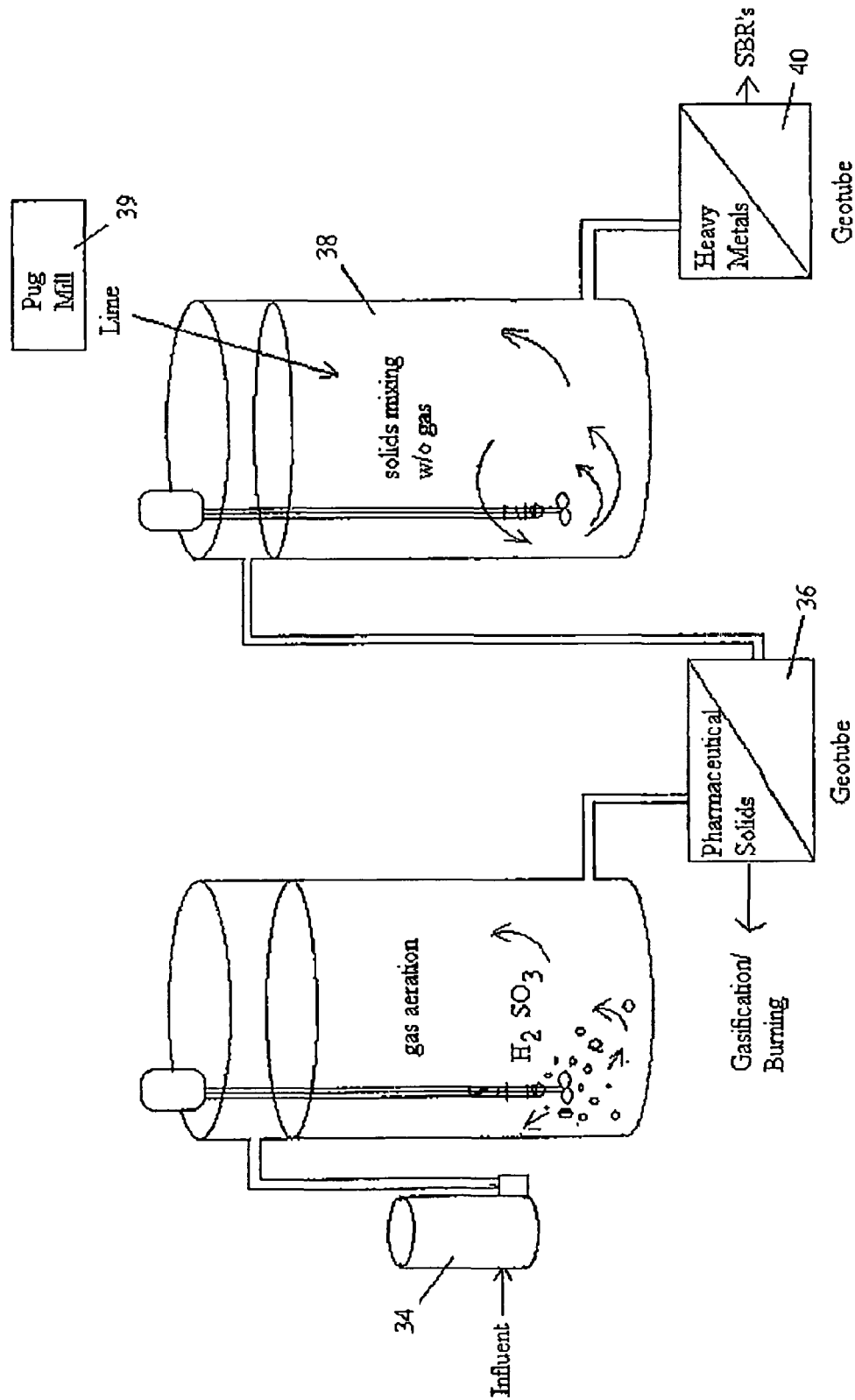
FIG. 3 is an expanded detail of the equipment retrofit of FIG. 2.

FIG. 3 is an expanded detail of the equipment retrofit of FIG. 2.

The pre-treatment method thus provides an inexpensive chemical installation and method to degrade and remove a number of chemicals/pharmaceuticals in wastewater influent via acid reduction and removal of suspended solids of sorbed polar pharmaceuticals/chemicals before liming the filtered acidified influent to further precipitate heavy metals and other chemicals/pharmaceuticals and raise the pH of the treated effluent for biodigestion with anaerobic and aerobic bacteria to further remove chemicals/pharmaceuticals. Further, as the filtered wastewaters allow light to penetrate, photo degredation of chemicals/pharmaceuticals also results.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description.

I claim:

1. A treatment method to enhance the treatment of wastewater containing pathogens, chemicals/pharmaceuticals, and suspended solids at wastewater treatment plants employing bioreactors by removing chemicals/pharmaceuticals before biological reduction comprising:

a. injecting $SO_2$ into wastewater influent forming acidified wastewater at a pH which generates sufficient sulfurous acid for
  i. conditioning suspended solids to agglomerate and sorb polar chemicals/pharmaceuticals to separate from the liquid fraction of the acidified wastewater, and
  ii. providing free SO2 for reducing chemical oxidants in the wastewater influent to produce an acidified treated influent,
b. separating the agglomerated suspended solids from the acidified treated influent for disposal,
c. adjusting the pH of the acidified treated influent with hydrated or anhydrous lime, ammonia, sodium and potassium hydroxide and other alkaline chemicals to reduce the biocidal properties of any free $SO_2$, sulfite, and bisulfite in the wastewater and provide a pH conditioned wastewater suitable for subsequent environmental biological treatment, and precipitating heavy metals as metal hydroxides, excess sulfates as gypsum, excess phosphates as calcium phosphate and other alkaline precipitates to produce a treated effluent,
d. separating the alkaline precipitates in the treated effluent for reuse or disposal, and
e. passing the treated effluent through the sewage treatment plant's bioreactors for anaerobic and aerobic degradation of remaining chemicals/pharmaceuticals in the treated effluent or through an environmental biological system to produce a recovered treated wastewater.

2. A treatment method according to claim 1, wherein the pH of the acidified wastewater is held between 2 and 6.5 to acid leach heavy metals from the suspended solids into solution.

3. A treatment method according to claim 2, wherein the pH of the acidified wastewater is held between 2 and 3.5 until disinfection occurs.

4. A treatment method according to claim 1, wherein the pH conditioned wastewater is raised to a pH of between 7 and 9 to precipitate out iron, chromium, copper, zinc, and nickel hydroxides.

5. A treatment method according to claim 1, wherein all or a portion of the treated effluent is diverted for raising crops and photobiomass, and the alkaline chemicals used to raise the pH of the diverted treated effluent is selected to provide micronutrients in the treated effluent required for raising crops or photobiomass.

6. A treatment method according to claim 1, wherein the pH conditioned wastewater is raised with aqueous, nonaqueous lime or spent lime to precipitate out calcium salts and counterbalance sodium concentrations.

7. A treatment method according to claim 1, wherein the recovered treated wastewater is further polished by aquatic plant treatment to remove heavy metals, pathogens, chemicals/pharmaceuticals, and micronutrients to a level suitable for open water discharge or soil aquifer treatment.

8. A treatment method according to claim 7, wherein the aquatic plant used for aquatic plant treatment is duckweed.

9. A treatment method according to claim 1, wherein the agglomerated suspended solids are burned or gasified to destroy any sorbed pharmaceuticals.

10. A treatment method according to claim 1, including the addition of activated carbon to sorb additional chemicals/pharmaceuticals before removal of the suspended solids.

11. A treatment method according to claim 1, wherein the concentration of sorbed chemicals/pharmaceuticals are not sufficient for separating the agglomerated suspended solids before adjusting the pH so that this step is omitted.

12. A treatment method according to claim 1, including aerating or oxidizing the influent before SO2 treatment to oxidize chemicals/pharmaceuticals and kill viruses.

13. A treatment method to enhance the treatment of wastewater containing pathogens, chemicals/pharmaceuticals, and suspended solids at wastewater treatment plants employing bioreactors by removing chemicals/pharmaceuticals before biological reduction comprising:
  a. aerating or oxidizing the wastewater influent to oxidize chemicals/pharmaceuticals and kill viruses in the wastewater influent to form an oxidized wastewater influent,
  b. injecting sufficient $SO_2$ into the oxidized wastewater influent to form a sulfurous acid acidified wastewater at a pH less that 3.5 which
    i. conditions suspended solids to agglomerate and sorb polar chemicals/pharmaceuticals to separate from the liquid fraction of the acidified wastewater,
    ii. acid leaches heavy metals from the suspended solids into the liquid fraction, and
    iii. provide free SO2 for reducing chemical oxidants in the wastewater influent to produce an acidified treated influent,
  c. holding the acidified treated influent until disinfection occurs,
  d. separating the agglomerated suspended solids from the acidified treated influent for disposal,
  e. adjusting the pH of the acidified treated influent with hydrated, anhydrous or spent lime to a pH of between 7 and 9 to reduce the biocidal properties of any free $SO_2$, sulfite, and bisulfite in the wastewater, and provide a pH conditioned wastewater suitable for subsequent environmental biological treatment, and precipitating iron, chromium, copper, zinc, and nickel hydroxides, excess sulfates as gypsum, excess phosphates as calcium phosphate and other alkaline precipitates to produce a treated effluent,
  f. separating the alkaline precipitates in the treated effluent for reuse or disposal, and
  g. passing the treated effluent through the sewage treatment plant's bioreactors for anaerobic and aerobic degradation of remaining chemicals/pharmaceuticals in the treated effluent.

14. A treatment method according to claim 13, wherein all or a portion of the treated effluent is diverted for raising crops and photobiomass, and the alkaline chemicals used to raise the pH of the diverted treated effluent is selected to provide micronutrients in the treated effluent required for raising crops or photobiomass.

15. A treatment method according to claim 13, wherein the recovered treated wastewater is further polished by aquatic plant treatment to remove heavy metals, pathogens, chemicals/pharmaceuticals, and micronutrients to a level suitable for open water discharge or soil aquifer treatment.

16. A treatment method according to claim 15, wherein the aquatic plant used for aquatic plant treatment is duckweed.

17. A treatment method according to claim 13, wherein the agglomerated suspended solids are burned or gasified to destroy any sorbed pharmaceuticals.

18. A treatment method according to claim 13, including the addition of activated carbon to sorb additional chemicals/pharmaceuticals before removal of the suspended solids.

* * * * *